United States Patent
Yao et al.

(10) Patent No.: US 6,795,763 B2
(45) Date of Patent: Sep. 21, 2004

(54) EXPERT-TYPE VEHICLE STEERING CONTROL SYSTEM AND METHOD

(75) Inventors: Yixin Yao, Ann Arbor, MI (US); Gregory James Stout, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/283,596

(22) Filed: Oct. 30, 2002

(65) Prior Publication Data

US 2004/0088093 A1 May 6, 2004

(51) Int. Cl.[7] .................... G06F 17/00; B62D 5/04
(52) U.S. Cl. ...................................................... 701/44
(58) Field of Search ............................... 701/36, 41–42, 701/44; 706/1–4, 8–9

(56) References Cited

U.S. PATENT DOCUMENTS

| 4,930,084 A | | 5/1990 | Hosaka et al. |
| 5,180,214 A | | 1/1993 | Yeh et al. |
| 5,487,007 A | * | 1/1996 | Suzuki et al. ............... 701/44 |
| 5,519,614 A | * | 5/1996 | Miichi et al. ............... 701/44 |
| 6,370,460 B1 | | 4/2002 | Kaufmann et al. |

* cited by examiner

*Primary Examiner*—Thu V. Nguyen
(74) *Attorney, Agent, or Firm*—Brinks Hofer Gilson & Lione

(57) ABSTRACT

The present invention involves a system and method of controlling a vehicle steer-by-wire system to provide the variable and adjustable steering feel for the driver utilizing expert-type fuzzy logic technology. The steering wheel fuzzy logic controller controls the steering wheel torque to produce the variable and adjustable steering feel continuously based on changes in steering wheel angle, road wheel torque and vehicle speed.

42 Claims, 6 Drawing Sheets

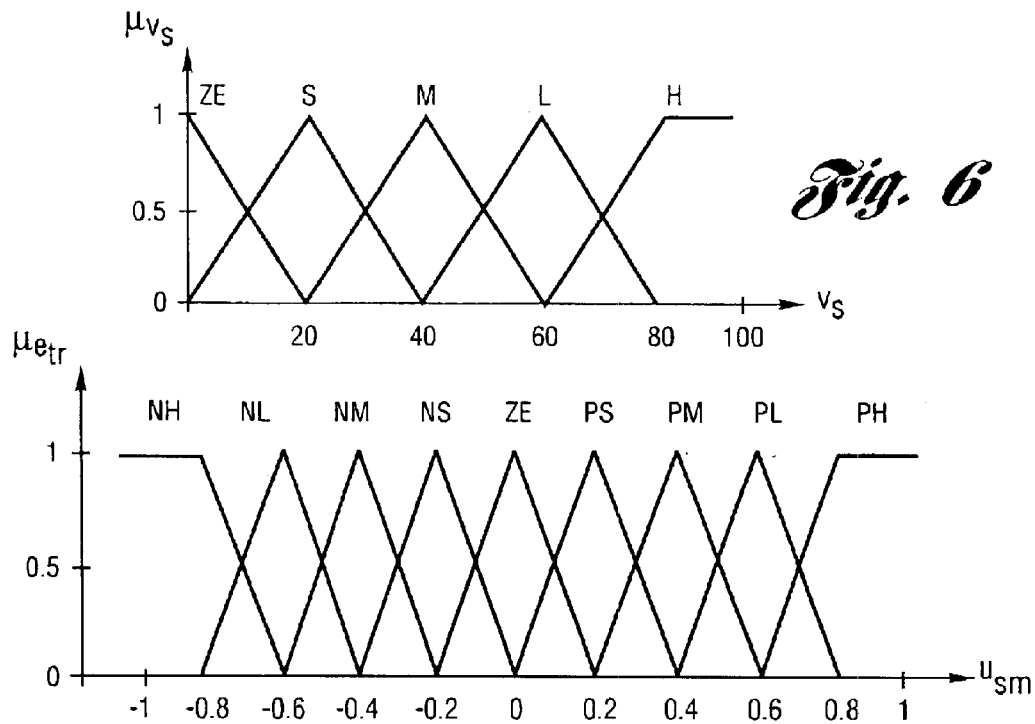
Fig. 6
Fig. 7
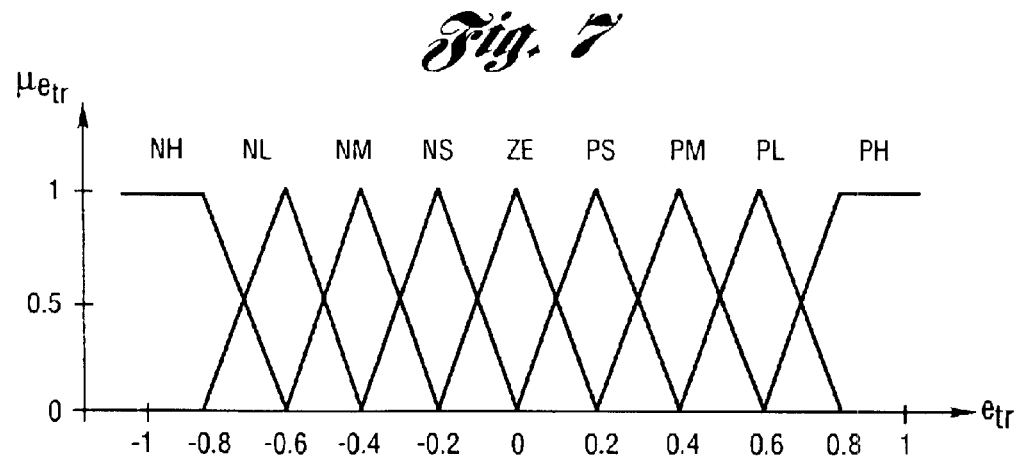
Fig. 8
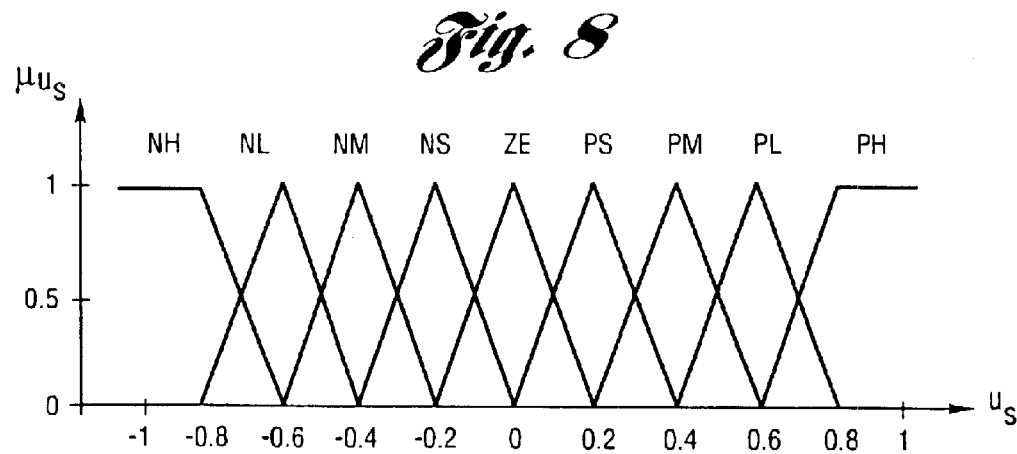
Fig. 9

| | STEERING WHEEL ANGLE ERROR $e_{sr}$ | | | | | | | |
|---|---|---|---|---|---|---|---|---|
| | NH | NL | NM | NS | ZE | PS | PM | PL | PH |
| Z | NM | NM | NS | NS | ZE | PS | PS | PM | PM |
| S | NM | NM | NM | NS | ZE | PS | PM | PM | PM |
| M | NL | NM | NM | NS | ZE | PS | PM | PM | PL |
| L | NL | NL | NL | NM | ZE | PM | PL | PL | PL |
| H | NH | NH | NL | NL | ZE | PL | PL | PH | PH |

(VEHICLE SPEED Vs)

| | TORQUE ERROR $e_{tr}$ | | | | | | | |
|---|---|---|---|---|---|---|---|---|
| | NH | NL | NM | NS | ZE | PS | PM | PL | PH |
| Z | NM | NS | NS | NS | ZE | PS | PS | PS | PM |
| S | NM | NM | NS | NS | ZE | PS | PS | PM | PM |
| M | NM | NM | NM | NS | ZE | PS | PM | PM | PM |
| L | NL | NM | NM | NM | ZE | PM | PM | PM | PL |
| H | NH | NL | NL | NM | ZE | PM | PM | PL | PH |

(VEHICLE SPEED Vs)

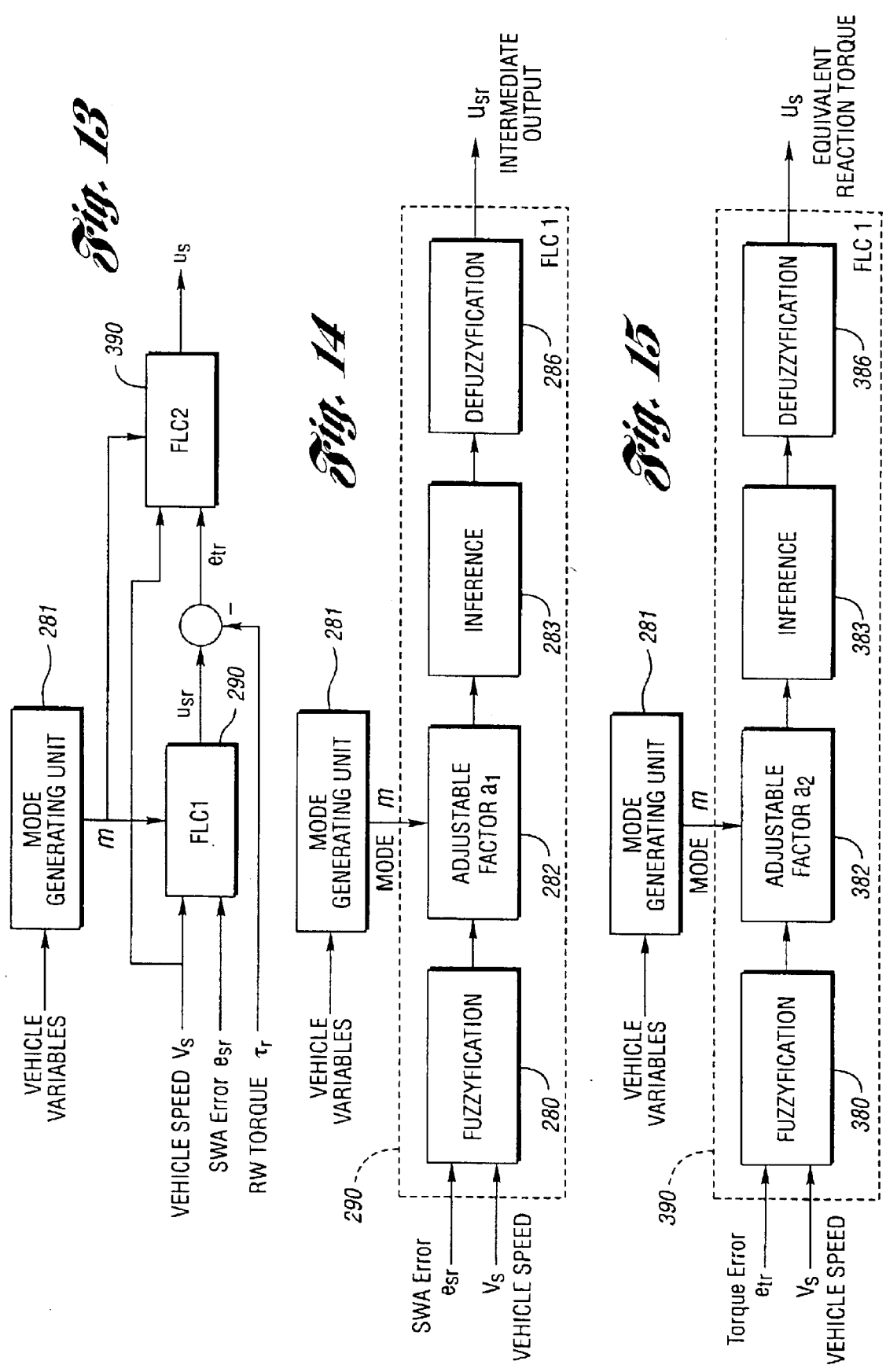

EXPERT-TYPE VEHICLE STEERING CONTROL SYSTEM AND METHOD

BACKGROUND OF THE INVENTION

The present invention relates to a system and method of controlling a vehicle steer-by-wire system to provide variable and adjustable steering feel for a driver, wherein the system utilizes expert-type fuzzy logic technology to improve vehicle handling performance and safety.

One vehicle attribute that can improve vehicle handling performance and safety is a steering feel for the driver. Steering feel represents a general relationship between the torque at the steering wheel and the force at the road wheel tire-road surface contact. The force at the road wheel tire-road surface contact should be fed back to the steering wheel to produce steering wheel torque felt by the vehicle driver. This steering torque feedback allows the vehicle driver to rely on the steering feel to sense and maintain control of the direction of the vehicle. If the steering torque feedback is not present and appropriately tuned for the vehicle application, then the driver may experience vagueness in feel and degradation in overall directional controllability.

A common current production steering system is a power-assisted steering system with mechanical linkages. Such systems provide a determinate steering wheel torque curve based on their mechanical and hydraulic arrangement. In a steer-by-wire system that does not rely on a mechanical connection between the steering wheel and the road wheels, the requirement is to produce not only the same steering functions and steering feel as a conventional mechanically linked steering system, but also advanced steering features including a variable and an adjustable steering feel. Thus, different steering feel can appear in the same vehicle based on driver choice.

Steer-by-wire systems have been challenged in providing the advanced steering features including a variable steering feel and an adjustable variable steering feel. Such advanced steering features with variable and adjustable steering feel can be implemented by applying advanced control strategies and control system design. The electric motor-based steer-by-wire control system provides a flexible application environment for control system designers to use more sophisticated and advanced control strategies in order to achieve the expected steering features. Some of the steering features include providing steering feel, steering wheel command angle, active steering wheel return, and road wheel tracking for steering wheel command.

The improvement of handling performance and operational safety could benefit from the professional vehicle driver's necessary knowledge and experiences. Based on knowledge and experiences, a professional driver relies on the steering feel to sense and maintain control of the direction of the vehicle while making judgments regarding constant changes of surrounding circumstances and making predictions regarding driving circumstances. It is a challenge to incorporate the feelings, judgments, predictions and impression of a professional driver into steer-by-wire control system to realize objective of variable steering feel. It is difficult to realize this objective by using conventional control system design technologies that deal with crisp input and output physical variables and need a distinct relationship among all physical variables quantitatively, as well as require exact controlled system mathematical models. Furthermore, the conventional control techniques are unable to account directly for the difference or diversity in subjective steering feel requirements among individual vehicle drivers.

BRIEF SUMMARY OF THE INVENTION

The present invention generally provides a system and method of controlling a vehicle steer-by-wire system to provide the variable steering feel for the driver utilizing expert-type fuzzy logic technology. Applying the fuzzy logic description, feelings, judgments, predictions and impression of a professional driver are incorporated directly into a steer-by-wire control system to realize objectives of variable and adjustable steering feels.

The steer-by-wire system includes two different parts according to their functions: a steering wheel control system and a road wheel control system. The steering wheel control system provides steering feel for the driver, steering wheel angle command to road wheel control system, and active steering wheel return. The road wheel control system provides the actual road wheel angle tracking to the steering wheel command angle. The steering wheel control system and the road wheel control system are in electrical communication each other. The steering wheel control system further includes a fuzzy logic controller to receive a steering wheel angle signal from the steering wheel system, a road wheel angle signal and a road wheel torque signal from the road wheel control system and vehicle speed signal from the vehicle. The fuzzy logic controller controls steering wheel torque to produce the variable steering feel continuously based on changes in steering wheel angle, road wheel torque and vehicle speed by applying fuzzy logic control technology.

In one embodiment, the fuzzy logic controller incorporates the experience and knowledge of professional drivers into an expert-type steering wheel control system to infer a desired steering feel. These experience and knowledge can be expressed in fuzzy logic inference rules in fuzzy logic controller using the natural language description. These fuzzy logic inference rules provide difference and diversity for steering feelings of individual drivers. Thus, the fuzzy logic controller design does not require mathematical models of the controlled steering system to realize predictive judgments using the experience and steering system tuning knowledge of professional drivers.

This invention describes the fuzzy logic based steering wheel torque control method implemented in the fuzzy logic controller. The fuzzy logic based steering wheel torque control operates in three steps: fuzzification, inference, and defuzzification. All crisp input and output variables including steering wheel angle error signal, road wheel torque signal and vehicle speed signal and are converted into values in the fuzzy sets by defining labels and membership functions. Then, using labels and membership functions as defined in the stage of fuzzification, a set of rules for the fuzzy inference stage are given to describe required steering wheel torque output based on the experience and steering system tuning knowledge of professional drivers. The steering wheel torque in a linguistic value description is then converted to a crisp value in the stage of defuzzification.

The present invention also describes a new development of variable steering torque control with an adjustable variable steering torque control function. The steering feel will not only vary with the steering wheel angle, road wheel torque, and vehicle speed, but it will also vary according to the type of driving and environmental situation. The adjustable variable torque function could be set by the vehicle driver or could be set automatically based on the type of driving and environmental situations. The vehicle variables that cause the steering wheel torque adjustment can be detected using sensors and estimated using other variables.

This provides adjustable steering feel automatically and adaptively according to the vehicle driver's predictive judgment for driving condition changes.

Further aspects, features, and advantages of the invention will become apparent from consideration of the following description and the appended claims when taken in connection with the accompanying drawings.

BRIEF DESCRIPTION OF THE DRAWINGS

FIG. 6 is a graphical description of vehicle speed membership function with labels;

FIG. 7 is a graphical description of intermediate torque control variable membership function with labels;

FIG. 8 is a graphical description of torque error membership function with labels;

FIG. 9 is a graphical description of reaction torque control variable membership function with labels;

FIG. 13 is a another simplified block diagram of the fuzzy logic controller implementing the adjustable variable steering feel in the steer-by-wire system of FIG. 2;

FIG. 14 is a block diagram of first fuzzy logic controller with an adjustable factor and mode generating unit; and FIG. 15 is a block diagram of second fuzzy logic controller with another adjustable factor and mode generating unit.

DETAILED DESCRIPTION OF THE INVENTION

In a steer-by-wire system, traditional steering system components, such as the steering column, intermediate shaft, pump, are eliminated. The mechanical linkages between the drive controls and the steering mechanisms are replaced with various electro-mechanical road wheel actuators, motor-based force feedback steering wheel or joystick devices, and a distributed network of electronic control modules.

Figure 1:
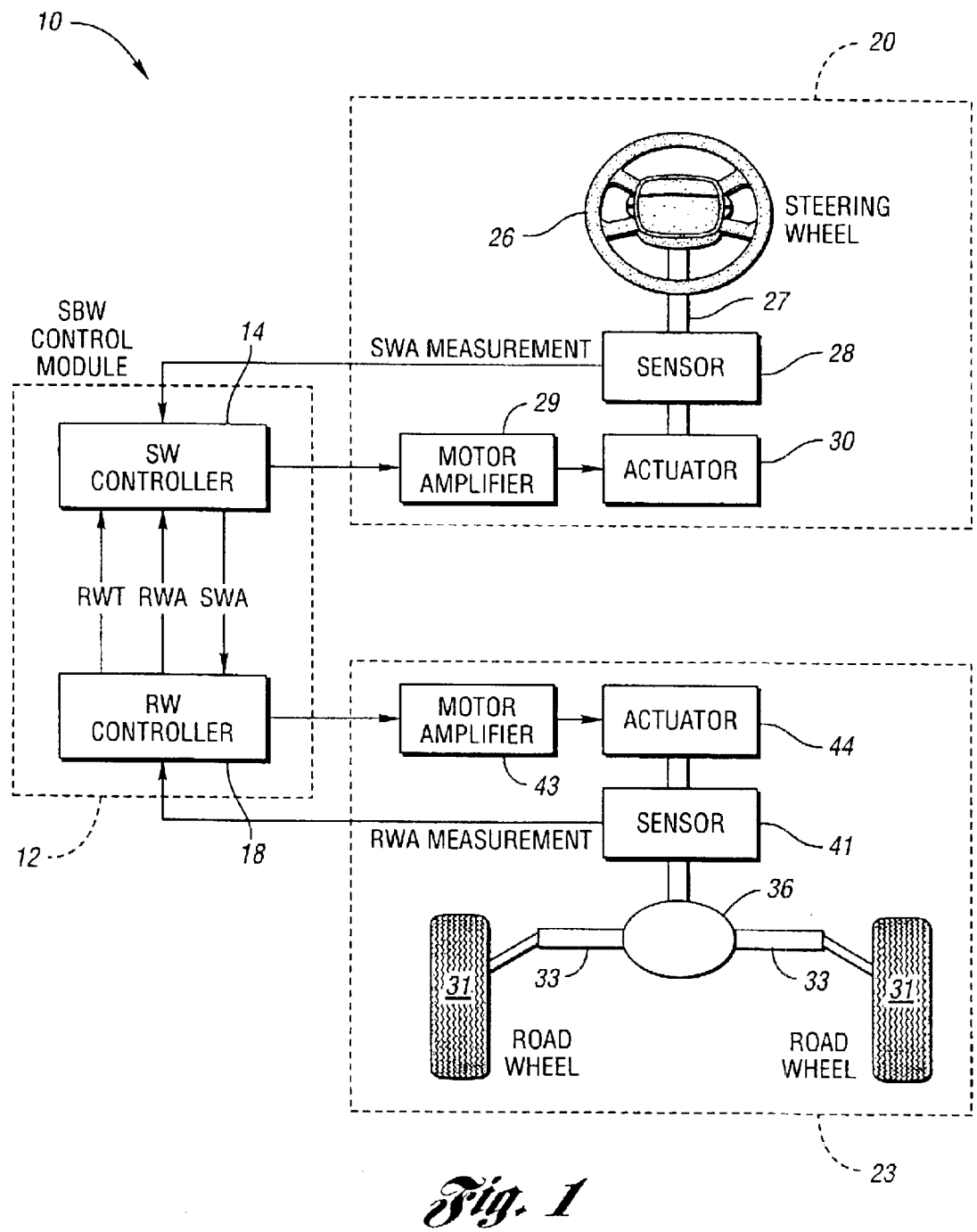
FIG. 1 is a schematic diagram of a vehicle steer-by-wire system in accordance with the present invention.

FIG. 1 illustrates a steer-by-wire system 10 of a vehicle having a steer-by-wire control module 12. As shown in FIG. 1, steer-by-wire control module 12 is in electrical communication with a steering wheel assembly unit 20 and road wheel assembly unit 23. As shown, control module 12 includes a steering wheel controller 14 and a road wheel controller 18. Steering wheel controller 14 is in electrical communication with the road wheel controller 18. In this embodiment, control module 12 implements steer-by-wire system control by controlling steering wheel assembly unit 20 and road wheel assembly unit 23. It is implemented generally by utilizing microprocessors. One or a plurality of microprocessors may be used without falling beyond the scope or spirit of the present invention.

As shown in FIG. 1, steering wheel assembly unit 20 includes steering wheel 26 mounted to steering wheel shaft 27. Steering wheel assembly unit 20 further includes steering wheel sensor 28 mounted to steering wheel shaft 27 for sensing a steering wheel angle. A steering wheel angle is an angle relative to a center position from which the steering wheel is rotated. The steering wheel sensor 28 may be in electrical communication with steering wheel controller 14 which may receive signals indicative of steering wheel angle of the steering wheel.

Steering assembly unit 20 may further include a steering wheel amplifier 29 which is in electrical communication with steering wheel controller 14. Steering unit 20 may further include a steering wheel motor actuator 30 which is in electrical communication with the steering wheel amplifier 29 and is attached to steering shaft 27 for receiving power from the steering wheel amplifier 29 and for generating torque on the steering wheel 26.

As shown in FIG. 1, road wheel assembly unit 23 includes road wheels 31 and tie rods 33, wherein each road wheel 31 is connected to one of the tie rods 33. Road wheel assembly unit 23 further includes a gear assembly 36 to which each tie rod 33 is attached. Road wheel assembly unit 23 further includes a road wheel sensor 41 attached to motor actuator 44 for sensing a road wheel angle. This may include one or a plurality of road wheel sensors. Alternatively, sensor 41 may be mounted to or adjacent a road wheel to sense road wheel angle and torque thereon during operation of the vehicle. As shown, sensor 41 may be in electrical communication with road wheel controller 18 for sending signals indicative of road wheel angles to be processed by controller 18.

Road wheel assembly unit 23 may also include a road wheel amplifier 43 for receiving control signals from road wheel controller 18. Road wheel assembly unit 23 further includes a road wheel motor actuator 44 in electrical communication with the road wheel amplifier 43. The road wheel motor actuator 44 may receive current control signals from the road wheel amplifier 43 to apply torque on the road wheels 31.

In this embodiment, the road wheel unit 23 includes at least one sensor, amplifier, and actuator for each wheel or both wheels. Of course any number of sensors, amplifiers, or actuators may be used for the road wheel without falling beyond the scope or spirit of the present invention.

Steer-by-wire system 10 shown in FIG. 1 may be configured as two systems according to their different functions: steering wheel control system and road wheel control system. Steering wheel control system 16 is comprised of the steering wheel assembly unit 20 and its controller 14. Road wheel control system 17 is comprised of road wheel assembly unit 23 and its controller 18. The steering wheel control system 16 provides steering feel for the driver, steering wheel angle command, and active steering wheel return. The road wheel control system 17 provides actual road wheel angle tracking to the steering wheel command angle. The steering wheel control system and the road wheel control system are in electrical communication each other. Steering wheel control system 16 receives the measured steering wheel angle signal, steering wheel reference signal from the measure road wheel angle signal, and measured or estimated road wheel torque signal. The road wheel control system 17 received the steering wheel angle command signal. Both systems receive the vehicle signals, such as vehicle speed (no shown in Figure).

Figure 2:
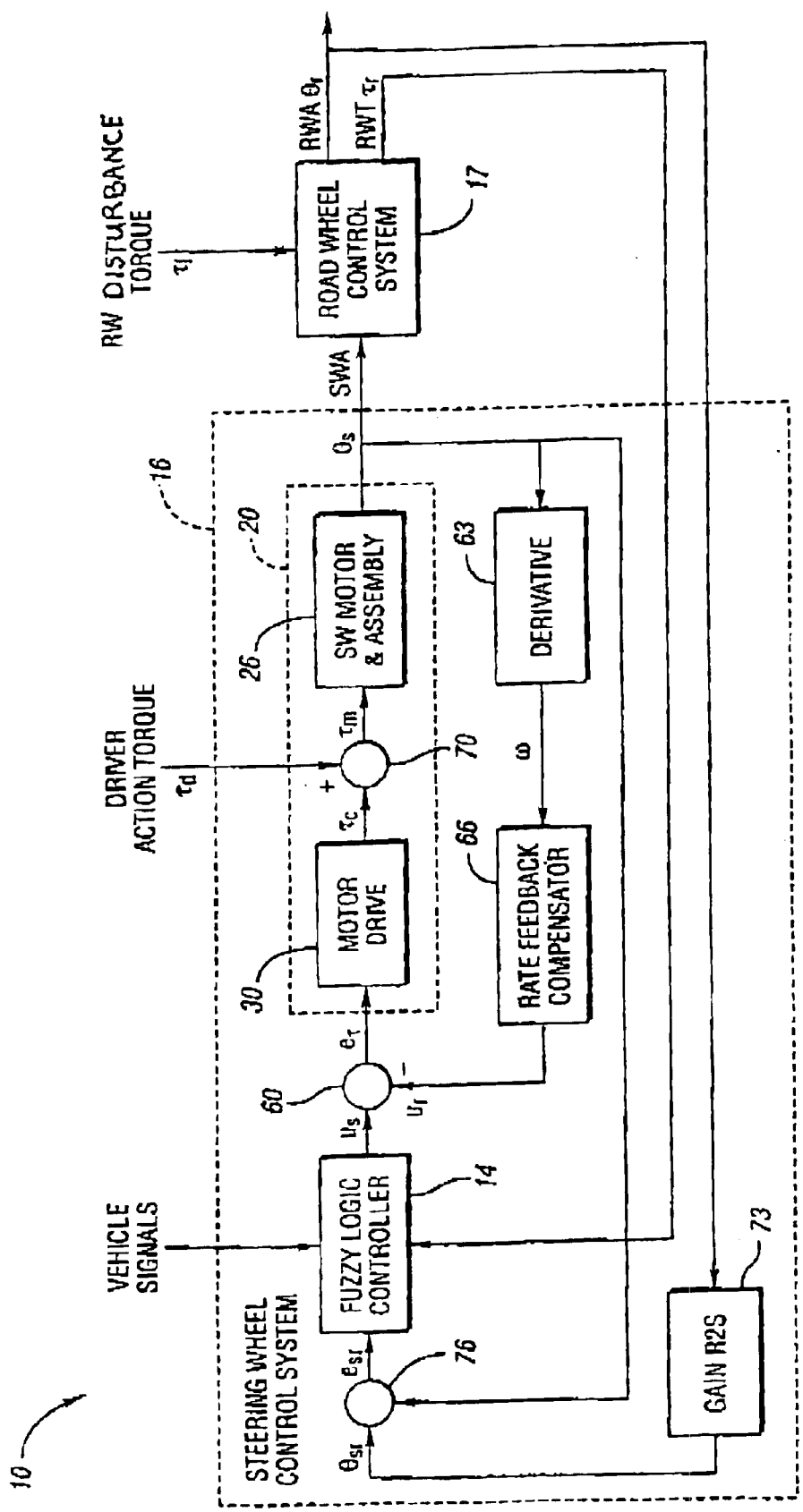
FIG. 2 is a block diagram of the steer-by-wire control system in which a fuzzy logic controller is depicted in accordance with the present invention.

FIG. 2 illustrates a block diagram of the steer-by-wire control system in accordance with the present invention. This provides a control system structure for control of the steer-by-wire system shown in FIG. 1. The steer-by-wire control system in FIG. 2 is applied to implement the required steering features including the variable steering feel. As shown in FIG. 2, steering wheel control system 16 is illustrated in detail and road wheel control system 17 is described by using only a single block. Two control systems are integrated as a steer-by-wire control system by signal connections. Steering wheel control system 16 receives the measured road wheel angle signal $\theta_r$, measured or estimated road wheel torque signal $\tau_r$ and vehicle speed signal $v_s$. The road wheel control system 17 receives the steering wheel angle signal $\theta_s$.

Steering wheel control system 16 is controlled by applying the fuzzy logic control technology. Thus, steering wheel controller 14 is a fuzzy logic controller. As shown in FIG. 2, fuzzy logic controller 14 receives a steering angle error signal $e_{sr}$, a measured or estimated road wheel torque signal $\tau_r$, and a measured vehicle speed signal $v_s$. The steering angle error signal $e_{sr}$ is indicative of an angle difference between the steering wheel reference angle $\theta_{sr}$ and steering wheel angle $\theta_s$. The road wheel torque signal $\tau_r$ is indicative of road wheel torque and the vehicle speed signal $v_s$ is indicative of vehicle speed. Fuzzy logic controller 14 generates the output control command signal $u_s$ based on these input signals by applying fuzzy logic control algorithm. The output control command signal $u_s$ is proportional to a torque to be applied to the steering wheel felt by vehicle driver. Torque felt by driver is referred to as a steering wheel reaction torque. Thus, $u_s$ is also referred to as the reaction torque control signal or variable.

There are two feedback control loops in steering wheel control system 16 shown in FIG. 2. The measured steering wheel angle signal $\theta_s$ is negatively fed back and is subtracted from the steering wheel reference angle $\theta_{sr}$ in the summer 76 to form the position feedback loop which includes steering wheel fuzzy logic controller 14 and steering wheel controlled plant 20. The controlled plant 20 in FIG. 2 is the block diagram description of steering wheel assembly unit 20 in FIG. 1.

The steering wheel angular rate signal $\omega$ is used to form steering wheel rate feedback loop including rate feedback compensator 66 and steering wheel controlled plant 20. The steering wheel angular rate signal $\omega$ is obtained from steering wheel angle signal $\theta_s$ using derivator 63 with calculation $\omega = d\theta_s/dt$. The steering wheel angular rate signal is used as an input signal of rate feedback compensator 66. The output control signal $u_r$ of rate feedback compensator 66 is negatively fed back and is subtracted from the output control command signal $u_s$ in the summer 60 to form rate feedback loop. The forward path signal $e\tau$ between the output command signals $u_s$ and $u_r$ is forwarded to the steering wheel controlled plant 20.

In this embodiment, the main functions of the steering wheel rate compensation loop are to improve the damping of steering wheel control system and providing the adjustable steering wheel return rate. The vehicle speed signal may be applied to be a scheduling signal for the rate feedback controller 66 to realize variable damping and steering wheel return rate functions.

In FIG. 2, $\tau_d$ represents the disturbance torque and $\tau_c$ represents the reaction torque. A driver's action to turn the steering wheel may be termed as providing an equivalent external disturbance torque $\tau_d$ on the steering wheel control system in this invention. When an external disturbance torque $\tau_d$ is applied to the steering wheel control system as a typical feedback control system, the steering wheel control system will generate a reaction torque $\tau_c$ on the steering wheel to reject the disturbance torque $\tau_d$. The reaction torque $\tau_c$ is applied at a direction opposite the disturbance torque $\tau_d$, providing a familiar steering wheel feel to the driver. Moreover, an effective torque $\tau_m$ represents a difference between the reaction torque $\tau_c$ and the disturbance torque $\tau_d$. When driver holds and stop to rotate the steering wheel, the reaction torque $\tau_c$ is equal to external disturbance torque $\tau_d$, and the effective torque $\tau_m$ becomes to zero.

As shown in FIG. 2, actuator motor drive 30 receives control signal $e\tau$ and applies a corresponding amount of reaction torque $\tau_c$ to the steering wheel. As a result, the effective torque $\tau_m$ and steering wheel angle $\theta_s$ are produced. As shown, road wheel control system 18 receives a steering wheel angle signal from the steering wheel control system 16. A road wheel disturbance torque $\tau_f$ represents all external and internal disturbances acted in the road wheel control system 17. The road wheel control system 17 is designed to tracking steering wheel angle command with the accepted tracking error under the influence of the disturbance torque $\tau_f$. This in turn determines and produces a road wheel angle $\theta_r$ and a road wheel torque $\tau_r$. A resulting road wheel angle signal $\theta_r$ and a road wheel torque signal $\tau_r$ are fed back to the steering wheel control system 16.

As shown in FIG. 2, the steering wheel reference angle $\theta_{sr}$ is generated based on the road wheel angle $\theta_r$ input in block 73 with constant gain. The steering reference angle signal $\theta_{sr}$ is subtracted by the fed steering wheel angle $\theta_s$ in the summer 76 to form the steering wheel angle error $\theta_{sr}$. Thus, the steering wheel angle error $\theta_{sr}$ is the difference between the steering wheel angle $\theta_s$ and the steering reference angle signal $\theta_{sr}$ in this embodiment. The steering angle error $\theta_{sr}$ is received by steering wheel fuzzy logic controller 14.

Figure 3:
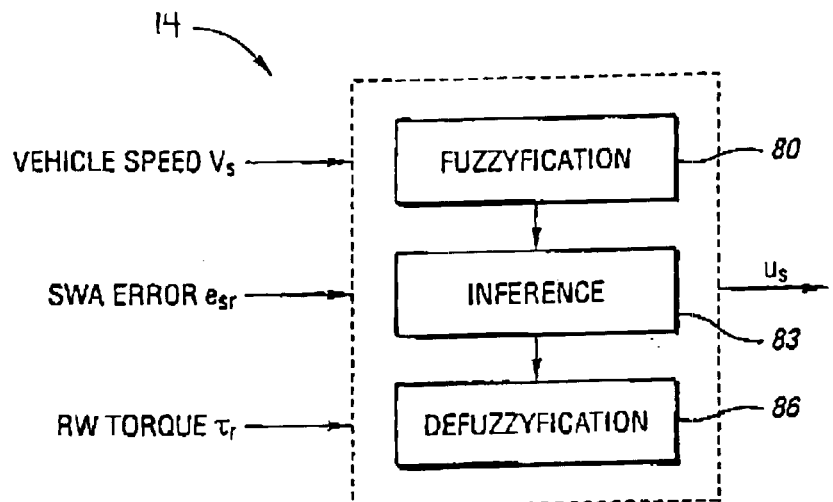
FIG. 3 is a block diagram of the fuzzy logic controller illustrating the fuzzy logic inference process in the steer-by-wire system of FIG. 2 in accordance with the present invention.

FIG. 3 shows a general block diagram of fuzzy logic controller 14 and its executing steps. As shown, fuzzy logic controller 14 includes three blocks or three executing steps as follows: a fuzzification block 80, an inference block 83 and a defuzzification block 86.

Figure 4:
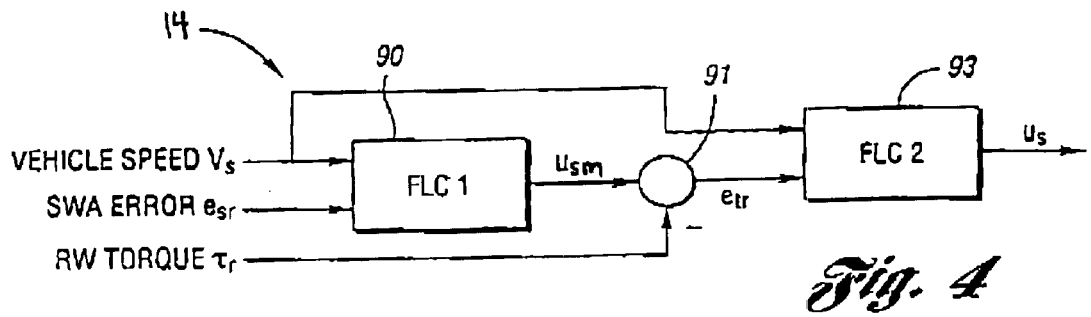
FIG. 4 is a simplified block diagram of the fuzzy logic controller implementing the variable steering feel in the steer-by-wire system of FIG. 2.

FIG. 4 further shows a block diagram of fuzzy logic controller 14 with a first fuzzy logic controller FLC 90 and a second fuzzy logic controller FLC 93 implemented in the actual steer-by-wire control system. Generally, the first fuzzy logic controller 90 receives a steering angle error $e_{sr}$ and a vehicle speed signal $v_s$. First fuzzy logic controller 90 generates an output intermediate torque control signal $u_{sm}$ based on the input steering angle error $e_{sr}$ and the input vehicle speed signal $v_s$. The intermediate torque control signal $u_{sm}$ is sent to the second fuzzy logic controller to be an input.

As shown in FIG. 4, a torque error signal $e_{tr}$ is determined based on the intermediate torque control signal $u_{sm}$ and the actual negative fed road wheel torque signal $\tau_r$ in summer 91. As shown, the torque error signal $e_{tr}$ and the vehicle speed signal $v_s$ are received by the second fuzzy logic controller 93 for processing. Generally, the second fuzzy logic controller 93 generates an output reaction torque control signal $u_s$ based on the torque error signal $e_{tr}$ and the vehicle speed signal $v_s$. The reaction torque control signal $u_s$ is proportional to reaction torque $\tau_c$ to be applied on the steering wheel felt by vehicle driver. Both of fuzzy logic controllers including first fuzzy logic controller 90 and second fuzzy logic controller 93 execute the fuzzy logic control algorithm with three steps shown in FIG. 3.

In the first fuzzy logic controller 90, three steps including a fuzzification 80, an inference 83 and a defuzzification 86 shown in FIG. 3 should be executed in tune. As the first step to apply the fuzzy logic control, the first fuzzy logic controller 90 converts the exact crisp input steering wheel angle error $e_{sr}$ and vehicle speed $v_s$ values into values in the fuzzy sets represented by membership functions and labels. In the process of fuzzification, a crisp value of a numerical input variable is labeled with a linguistic term, and the corresponding degree of membership for the input variable is determined. Thus, labels and membership functions for input variables including the steering wheel angle error $e_{sr}$ and vehicle speed $v_s$ will be defined first. The label and membership function for the output intermediate torque control variable $u_{sm}$ is also described at the same time.

Figure 5:
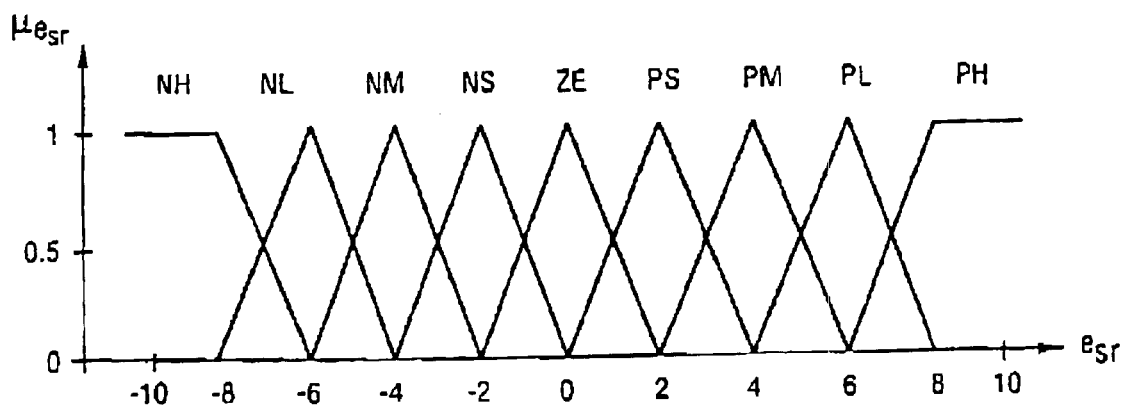
FIG. 5 is a graphical description of steering wheel angle error membership function with labels.

A membership function is a data curve that defines how each point in the input crisp values is mapped relative to a membership value (or degree of membership) between 0 and 1. In this embodiment, a degree of membership is a real number between 0 and 1 such that a transition from membership to non-membership is gradual rather than abrupt. The degree of membership for all its members thus describes a fuzzy set. The higher the number between 0 and 1, the higher the degree of membership. In this embodiment, a label to a crisp value of a numerical input or output variable is a linguistic term within a membership function which is used to identify each membership. Elements of a membership function are taken from a universe of discourse which is the total possible range for each variable. FIGS. 5–7 depict membership functions for input steering wheel angle error $e_{sr}$ and vehicle speed $v_s$ as well as output intermediate torque control variable $u_{sm}$ having triangular curves or shapes. However, it is to be noted that membership functions may have other shapes including but not limited to trapezoidal, bell curve, and rectangular step shapes.

In this embodiment, in order to fuzzify or convert a crisp value to a degree of membership with a label in the fuzzy set, corresponding labels and membership functions are determined first. Thus, as shown in FIG. 5, a steering wheel angle error membership function has been plotted depicting a plurality of steering angle error labels. As shown, nine triangular shaped curves are defined to cover the required range of an input value (universe of discourse). In this example, steering wheel angle error labels include two-letter abbreviations, each of which represent a range of crisp steering wheel angle errors. Here, N represents negative, P represents positive, ZE represents approximately zero, S represents small, M represents medium, L represents large, and H represents very large.

In the example shown in FIG. 4, the labels for the steering wheel angle error in the membership function with the predetermined steering angle error ranges are provided as follows:

| | | |
|---|---|---|
| NH: | negative very large | $-10° \sim -6°$ |
| NL: | negative large | $-8° \sim -4°$ |
| NM: | negative medium | $-6° \sim -2°$ |
| NS: | negative small | $-4° \sim 0°$ |
| ZE: | approximately zero | $-2° \sim +2°$ |
| PS: | positive small | $0° \sim +4°$ |
| PM: | positive medium | $+2° \sim +6°$ |
| PL: | positive large | $+4° \sim +8°$ |
| PH: | positive very large | $+6° \sim +10°$. |

As for vehicle variables regarding vehicle speeds, the vehicle speed membership function with relative labels for each member is shown in FIG. 6. Here, ZE represents approximately zero speed, S represents low speed, M represents medium speed, L represents high speed, and H represents very high speed. The labels for the vehicle speed in the membership function with the predetermined speed ranges are used in this embodiment as follows:

| | | |
|---|---|---|
| ZE: | approximately zero | <20 mph |
| S: | low | 0 ~ 40 mph |
| M: | medium | 20 ~ 60 mph |
| L: | high | 40 ~ 80 mph |
| H: | very high | >60 mph. |

As the output variable, the intermediate torque control variable $u_{sm}$ membership function with relative label for each member is given in FIG. 7. The shapes of membership and labels are same as that of the steering wheel angle error $e_{sr}$. The labels for the intermediate torque control variable $u_{sm}$ in the membership function with the predetermined ranges are used in this embodiment as follows:

| | | |
|---|---|---|
| NH: | negative very large | $-1.0 \sim -0.6$ |
| NL: | negative large | $-0.8 \sim -0.4$ |
| NM: | negative medium | $-0.6 \sim -0.2$ |
| NS: | negative small | $-0.4 \sim 0.0$ |
| ZE: | approximately zero | $-0.2 \sim +0.2$ |
| PS: | positive small | $0.0 \sim +0.4$ |
| PM: | positive medium | $+0.2 \sim +0.6$ |
| PL: | positive large | $+0.4 \sim +0.8$ |
| PH: | positive very large | $+0.6 \sim +1.0$. |

As shown in FIGS. 5 and 6, in the fuzzification block 80 of the first fuzzy logic controller 90, a degree of membership between 0 and 1 is determined for each crisp input value within a corresponding membership with relative labels. Each crisp input value falls into at least two memberships expressed by relative labels. For example, a crisp steering wheel angle error of –3° falls within the NM having a degree of membership 0.5 and the NS having a degree of membership 0.5 in FIG. 5. Thus, the crisp value of –3° for the steering wheel angle error is converted to 0.5 in the membership expressed with NM and 0.5 in the membership expressed with NS. In this embodiment, the steering wheel angle error –3° belongs to the "negative medium" membership at a 50 percent level and belongs to the "negative small" membership at a 50 percent level. As another example, a crisp vehicle speed of 45 mph falls within L (high) having a degree of membership of 0.25 and M (Medium) having a degree of membership of 0.75 as shown in FIG. 6.

Based on the result of fuzzification 80, the inference 83 infers the output fuzzy variable value by determining the degree of the membership function for the intermediate torque control variable in the first fuzzy logic controller 90. In this embodiment, the membership function with relative label for each member of the intermediate torque control variable $u_{sm}$ has been given in FIG. 7. Its degree of membership is determined further applying fuzzy logic inference 83 based on both degree of membership for the steering wheel angle error and the vehicle speed.

The inference process is implemented by using a set of rules. Using input and output variable membership functions as defined above, rules for the fuzzy inference 83 are written that embody a knowledge base and are determined by utilizing the knowledge and experience of professional drivers and control system designers. The rules may use several variables both in the condition and the conclusion of the rules. The rules are represented in English as if-then statements. For example: IF Steering Wheel Angle error is Negative Small (NS) and Vehicle Speed is Medium (M) THEN Intermediate Torque Control Variable is Negative Medium (NM).

The rules are defined to cover different situations from the steering wheel angle error input with the different vehicle speed to intermediate toque control output. The totality of such rules constitutes a fuzzy inference unit for the determination of the intermediate toque control variable value. The fifty-four rules are constructed corresponding to the possible combinations of the steering wheel angle error and the vehicle speed. A shorthand method of presenting these rules is in Table 1 shown in FIG. 10. In this embodiment, these rules are usually derived by utilizing the knowledge and experience of professional drivers and control system designers to achieve a desired intermediate toque control variable output.

Figures 10, 11, 12:
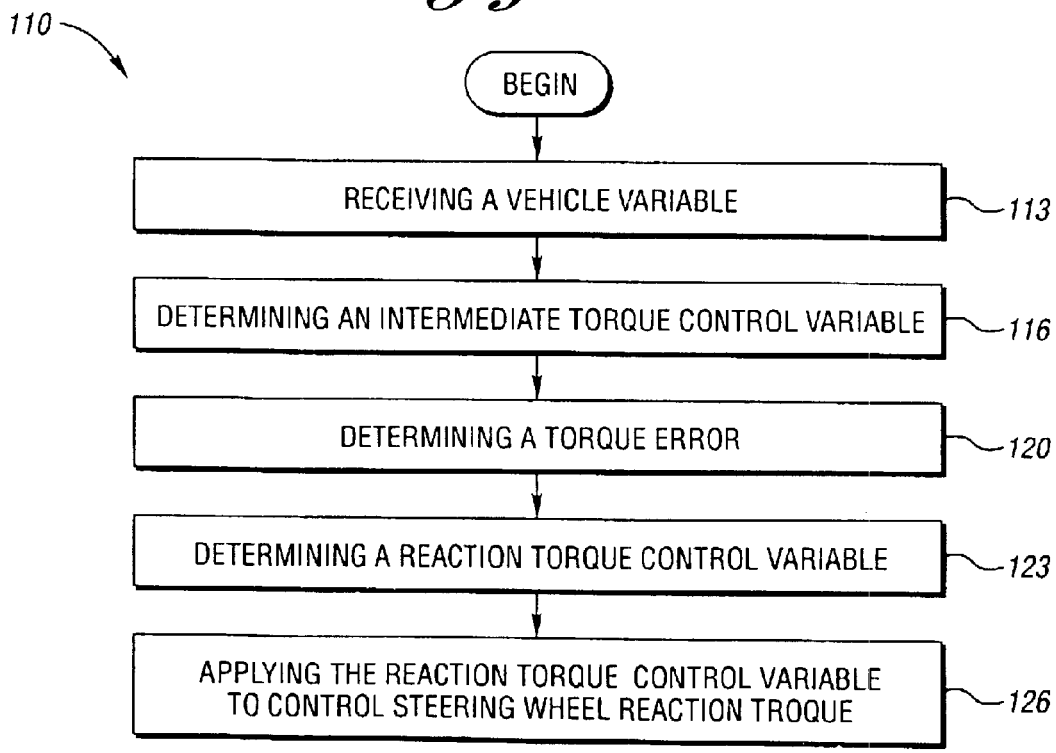
FIG. 10 is a first rule table depicting steering wheel angle error and vehicle speed inputs and resulting intermediate torque control variable output.
FIG. 11 is a second rule table depicting torque error and vehicle speed inputs and resulting reaction torque control variable output.
FIG. 12 is a flow chart of one general method of controlling a vehicle steer-by-wire system to provide the variable steering feel for the driver by using fuzzy logic control technology.

In the process of inference using the inference block 83 in FIG. 3, the entire set of rules shown in FIG. 10 is evaluated, and during this process some rules may "fire up" which means that they become active. For example, particular fuzzy logic rules in FIG. 10 are fired up when the steering wheel angle error is −3° and vehicle speed is 45 mph.

According to the membership functions for the steering wheel angle error and vehicle speed in FIG. 5 and FIG. 6, and rules table 1 in FIG. 10, these fuzzy logic rules are given as follows:

1. If (SWAerror is MN) and (Vspeed is M) then (IntermOut is MN)
2. If (SWAerror is SN) and (Vspeed is M) then (IntermOut is SN)
3. If (SWAerror is MN) and (Vspeed is L) then (IntermOut is MN)
4. If (SWAerror is SN) and (Vspeed is L) then (IntermOut is MN), where "SWAerror" represents steering angle error, "Vspeed" represents vehicle speed, and IntermOut represent intermediate torque control variable.

The degree of the membership function for the output intermediate torque control variable needs to be determined according to the degrees of the membership functions for inputs steering wheel angle error and vehicle speed. Since an AND operation is used for every rule, the minimum criterion of the inputs should be used according to the fuzzy logic operation rules. Therefore, the smaller degree of memberships for inputs steering wheel angle error and vehicle speed is chosen to be the degree of membership for the output intermediate torque control variable.

For example, with a crisp steering angle error of −3° and a vehicle speed of 45 mph mentioned above, a degree of membership of the intermediate torque control variable may be determined by using the minimum criterion. In this embodiment, the degree of membership of the intermediate torque control variable are determined as follows:

| Steering Angle Error | 0.50 NM | 0.50 NM | 0.50 NS | 0.50 NS |
|---|---|---|---|---|
| Vehicle Speed | 0.25 L | 0.75 M | 0.25 L | 0.75 M |
| Intermediate torque control variable | 0.25 NM | 0.5 NM | 0.25 NS | 0.5 NM |

The above four output results will be overlapped and then processed in the defuzzification 86.

In a defuzzification block 86, the fuzzy value must be converted to a crisp intermediate torque control variable. Defuzzification is a process that converts a fuzzy value into a crisp value. This may be accomplished by any suitable means including but not limited to a mean of maximum method, a maximizing decision method, and a Centroidal defuzzification (center of gravity) method.

In this embodiment, the Centroidal defuzzification method is used and may be provided as follows:

$$u_{sm} = \frac{\sum_{i=1}^{n} \mu_{u_{sm}}(x_i) x_i}{\sum_{i=1}^{n} \mu_{u_{sm}}(x_i)}.$$

Here, the crisp output intermediate torque control variable $u_{sm}$ is determined by means of center of gravity of the area under the membership function curve of the fuzzy output. Moreover, n is a total number of rules, $x_i$ is a running point in a discrete universe or the rule consequence of the ith, and $u_{sm}(x_i)$ is its membership value of the ith rule. Thus, in the example above, using the center of gravity method, a crisp value of the intermediate torque control variable value may be determined from the four membership values of the intermediate torque control variable, 0.25 NM, e.g., 0.5 NM, 0.25 NS, and 0.5 NM. The first fuzzy logic controller 90 transmits an intermediate torque control variable.

In the second fuzzy logic controller 93, three steps including a fuzzification 80, an inference 83 and a defuzzification 86 shown in FIG. 3 should be executed in tune. As the first step to apply the fuzzy logic control, the second fuzzy logic controller 93 receives and converts the crisp input torque error signal and vehicle speed $v_s$ values into values in the fuzzy sets represented by relative membership functions and labels.

As mentioned above, in order to fuzzify or convert a crisp value to a value in fuzzy sets, corresponding membership functions with labels for input variables including the torque error and vehicle speed is defined first. Thus, as shown in FIG. 8, a torque error membership function has been plotted depicting a plurality of torque error labels. As in the example above, in this example, torque error labels include two-letter abbreviations, each of which represent a range of crisp errors. Here, N represents negative, P represents positive, ZE represents approximately zero, S represents small, M represents medium, L represents large, and H represents very large.

In this example, the labels with a linguistic two-letters in the membership function of the torque error signal and their predetermined range are given as follows:

| | | |
|---|---|---|
| NH: | negative very large | −1 ~ −0.6 |
| NL: | negative large | −0.8 ~ −0.4 |
| NM: | negative medium | −0.6 ~ −0.2 |
| NS: | negative small | −0.4 ~ 0.0 |
| ZE: | approximately zero | −0.2 ~ +0.2 |
| PS: | positive small | 0.0 ~ +0.4 |
| PM: | positive medium | +0.2 ~ +0.6 |
| PL: | positive large | +0.4 ~ +0.8 |
| PH: | positive very large | +0.6 ~ +0.8. |

As mentioned in above and shown in FIG. 6, the vehicle speed membership function with relative labels for each member has been given.

As shown in FIGS. 6 and 8, in the fuzzification block 80 of the second fuzzy logic controller 93, a degree of membership between 0 and 1 is determined for each crisp input value within a corresponding membership with relative labels. Each crisp input value falls into at least two memberships expressed by relative labels. For example, a crisp torque error of −0.3 falls within the NM having a degree of membership 0.5 and the NS having a degree of membership 0.5 in FIG. 8. Thus, the crisp value of −0.3 for the torque error is converted to 0.5 in the membership expressed with NM and 0.5 in the membership expressed with NS.

In order to obtain the fuzzy logic inference result in the next step, the membership function with labels for the output reaction torque control variable is also defined in FIG. 9. The labels for the reaction torque control variable in the membership function and their range are provided as follows:

| | | |
|---|---|---|
| NH: | negative very large | −1.0 ~ −0.6 |
| NL: | negative large | −0.8 ~ −0.4 |
| NM: | negative medium | −0.6 ~ −0.2 |
| NS: | negative small | −0.4 ~ 0.0 |
| ZE: | approximately zero | −0.2 ~ +0.2 |
| PS: | positive small | 0.0 ~ +0.4 |
| PM: | positive medium | +0.2 ~ +0.6 |
| PL: | positive large | +0.4 ~ +0.8 |
| PH: | positive very large | +0.6 ~ +1.0. |

Based on the result of fuzzification 80, the inference 83 infers the output fuzzy variable value by determining the degree of the membership function for the reaction torque control variable in the second fuzzy logic controller 93. In this embodiment, the membership function with relative label for each member of reaction torque control variable has been given in FIG. 9. Its degree of membership is determined further applying fuzzy logic inference 83 based on both degree of membership for the steering wheel angle error and the vehicle speed.

Using membership functions of input and output variable as defined above, rules for the fuzzy inference 83 are written that embody a knowledge base and are determined by utilizing the knowledge and experience of professional drivers and control system designers. The rules are defined to cover the different situations from the torque error input with the different vehicle speed to the reaction toque control variable output. The totality of such rules constitutes a fuzzy inference unit for the determination of the reaction toque control variable value. The fifty-four rules are constructed corresponding to the possible combinations of the torque error and the vehicle speed. A shorthand method of presenting these rules is in Table 2 shown in FIG. 11. In this embodiment, these rules are usually derived by utilizing the knowledge and experience of professional drivers and control system designers to achieve a desired reaction toque control variable output.

In the process of inference using the inference block 83, the entire set of rules is evaluated, and during this process some rules may "fire up" which means that they become active. For example, particular fuzzy logic rules in FIG. 13 are fired up when the torque error −0.3 and vehicle speed is 45 mph. According to the membership functions for the torque error and vehicle speed in FIG. 8 and FIG. 6, and rules table 2 in FIG. 11, these fuzzy logic rules are given as follows:

21. If (RWTerror is MN) and (Vspeed is M) then (ETOut is MN)

22. If (RWTerror is SN) and (Vspeed is M) then (ETOut is SN)

30. If (RWTerror is MN) and (Vspeed is L) then (ETOut is MN)

31. If (RWTerror is SN) and (Vspeed is L) then (ETOut is MN), where "RWTerror" represents torque error, "Vspeed" represents vehicle speed, and ETOut represents reaction torque control variable.

In this embodiment, the minimum criterion of the inputs should be used according to the fuzzy logic operation rules since an AND operation is used for every rule. Therefore, the smaller degree of memberships for inputs torque error and vehicle speed is chosen to be the degree of membership for the output reaction torque control variable.

For example, with a crisp road torque error of −0.3° and a vehicle speed of 45 mph mentioned above, a degree of membership of the reaction torque control variable may be determined by using the minimum criterion. In this embodiment, the degree of membership of the reaction torque control variable is determined as follows:

| Road torque error | 0.50 NM | 0.50 NM | 0.50 NS | 0.50 NS |
|---|---|---|---|---|
| Vehicle Speed | 0.25 L | 0.75 M | 0.25 L | 0.75 M |
| Torque control variable | 0.25 NM | 0.5 NM | 0.25 NM | 0.5 SN |

The above four output results will be overlapped and then processed in the defuzzification block 86 shown in FIG. 3.

In a defuzzification block 86 for the second fuzzy logic controller 93, the fuzzy values which are represented by the degrees of memberships of the reaction torque control variable are converted to a crisp reaction torque control variable. This may be accomplished by any suitable means including but not limited to a mean of maximum method, a maximizing decision method, and a Centroidal defuzzification (center of gravity) method.

In this embodiment, the Centroidal defuzzification method is used and may be provided as follows:

$$u_s = \frac{\sum_{i=1}^{n} \mu_{u_s}(x_i) x_i}{\sum_{i=1}^{n} \mu_{u_s}(x_i)},$$

Here, $u_s$ is determined by means of center of gravity of the area under the membership function curve of the fuzzy output. Moreover, n is a total number of rules, $x_i$ is a running point in a discrete universe or the rule consequence of the ith, and $u_m(x_i)$ is its membership value of the ith rule. Thus, in this example, using the center of gravity method, a crisp value of the reaction torque control variable may be determined.

FIG. 12 depicts a flowchart of one method 110 of controlling a vehicle steer-by-wire system to provide the variable steering feel for the driver by using fuzzy logic control technology. Method 110 includes receiving a steering wheel angle error, a road wheel angle, a road wheel torque, and an actual vehicle speed in box 113. Method 110 further includes determining an intermediate torque control variable based on a steering wheel angle error and a vehicle speed by applying fuzzy logic inference process including fuzzification, Inference and defuzzification in box 116. Method 110 further includes determining a torque error based on the intermediate torque control variable and the actual road wheel torque in box 120. Method 110 further includes determining a reaction torque control variable based on the torque error and vehicle speed by applying fuzzy logic inference process including fuzzification, Inference and defuzzification in box 123. Method 110 further includes applying the reaction torque control variable to control the steering wheel reaction torque to provide a variable steering feel for the driver in box 126.

FIG. 13 depicts one embodiment of the fuzzy logic controller to provide adjustable variable steering feel for the driver in the steer-by-wire control system shown of FIG. 2. This fuzzy logic controller provides a variable steering wheel reaction torque control variable with adaptive capability for driving types and environmental situations. As shown in FIG. 13, a mode generating unit 281 is applied to the fuzzy logic controller to generate a variable mode output m and to very the adjustable factors in the fuzzy logic controller. FIGS. 14 and 15 show two fuzzy logic controllers 290 and 390 including in steering wheel fuzzy logic controller in FIG. 13 with adjustable factors $a_1$ and $a_2$ with change range 0~1.

In this embodiment, the first fuzzy logic controller 290 includes an adjustable factor unit 282 having an adjustable factor $a_1$ with change range 0~1. This adjustable factor $a_1$ is a typical weighting coefficient in the adjustable factor fuzzy logic algorithm. The adjustable factor $a_1$ may be adjusted based on a driving mode in this invention. The adjustable factor unit 282 receives a mode signal m from a mode generating unit 281 for adjusting the adjustable factor $a_1$ to proportionally affect a change in the membership functions of corresponding variables. As shown in FIG. 14, a variable mode m, is the output of the mode generating unit. As a result, the output of the first fuzzy logic controller, an intermediate torque control variable, will be adjusted according to the mode output variable m. The mode signal m may be indicative of a driving mode based on a driving style and an environmental situation.

As shown in FIG. 15, analogous to the first fuzzy logic controller 290, a second fuzzy logic controller 390 also includes an adjustable factor unit 382 having an adjustable factor $a_2$ with change range 0~1. This adjustable factor $a_2$ is also a typical weighting coefficient in the adjustable factor fuzzy logic algorithm. The adjustable factor $a_2$ may be adjusted based on a driving mode. The adjustable factor unit 382 receives a mode signal m from a mode generating unit 281 for adjusting the adjustable factor $a_2$ to proportionally affect a change in the membership functions of corresponding vehicle variables. As a result, the output of the second fuzzy logic controller, a reaction torque control variable, will be adjusted according to the mode output variable m to achieve the objective of adjustable steering wheel reaction torque. As mentioned above, the mode signal m may be indicative of a driving mode based on a driving style and an environmental situation.

The driving style may be any suitable driving style including luxury, sport, off-track, inclined, city, highway, and mountainous terrain. Of course, any other suitable driving style may be incorporated therein without falling beyond the scope or spirit of the present invention. The environmental situation may be any suitable environmental situation including dry, wet, icy, and high wind. Of course, any other suitable environmental situation may be incorporated therein without falling beyond the scope or spirit of the present invention.

According to the concept shown in FIG. 13, the adjustable variable steering feel could be set by the vehicle driver manually or be set automatically utilizing a user interface within the vehicle. The user interface may allow a driver or an occupant of the vehicle to select some fixed driving modes with the determinate mode output m or to select in an automatic driving model setting position having mode output m according to a driving style and an environmental situation. In the case of setting by the vehicle driver manually in the user interface, the variable mode m would be switched to a fixed constant unit such that the adjustable factors $a_1$ and $a_2$ does not vary in value. Thus, the fuzzy logic controller will only be affected by the fixed constant setting. In the case of setting the mode automatically, the mode m will vary with the driving type and the environmental situation. Thus, the driving type and the environmental situation selected by the driver or automatic setting may be incorporated within the steer-by-wire system in accordance with the present invention.

The mode generating unit 281 may be implemented by any suitable design technologies to generate a mode signal. Typically, The mode generating unit 281 may be designed by using fuzzy logic technology.

While the present invention has been described in terms of preferred embodiments, it will be understood, of course, that the invention is not limited thereto since modifications may be made to those skilled in the art, particularly in light of the foregoing teachings.

What is claimed is:

1. A method of controlling a vehicle steer-by-wire system to provide a variable steering feel for the driver, the method comprising:

receiving an actual steering wheel angle error, an actual road wheel torque, and an actual vehicle speed;

determining an intermediate torque control variable value using fuzzy logic inference process based on steering wheel angle error and vehicle speed;

calculating a torque error based on the intermediate torque control variable and the actual road wheel torque;

determining a reaction torque control variable value using fuzzy logic inference process based on the torque error and vehicle speed; and controlling the reaction torque of the steering wheel to provide a variable steering feel for the driver.

2. The method of claim 1 wherein the step of receiving includes:

sensing an actual steering wheel angle, the actual road wheel angle, the actual road wheel torque, and the actual vehicle speed; and determining the steering wheel angle error based on the actual steering wheel angle and the actual road wheel angle.

3. The method of claim 1 wherein determining the intermediate torque control variable value includes:

converting the steering angle error to fuzzy values based on a steering wheel angle error membership function with linguistic term labels and determining a corresponding degree of membership of the steering wheel angle error;

converting the actual vehicle speed to fuzzy values based on a vehicle speed membership function with linguistic term labels and determining a corresponding degree of membership of the vehicle speed;

determining a fuzzy intermediate torque control variable value by determining a degree of the intermediate torque control variable membership using fuzzy inference rules based on degree of membership of the steering wheel angle error and vehicle speed; and converting the fuzzy intermediate torque control variable to the crisp intermediate torque control variable value.

4. The method of claim 3 wherein determining the intermediate torque control variable based on the steering wheel angle error and the vehicle speed includes:

reading a set of fuzzy logic inference rules using the intermediate torque control variable as conclusion and the steering wheel angle error and the vehicle speed as conditions; and applying the set of fuzzy logic inference rules to infer the intermediate torque control variable.

5. The method of claim 4 wherein fuzzy logic inference rules are determined based on professional vehicle driver knowledge and experience to cover the different intermediate torque control variable value.

6. The method of claim 3 wherein converting the steering wheel angle error includes:

defining a steering wheel angle error membership function with linguistic term labels; and determining a corresponding degree of membership of the steering wheel angle error.

7. The method of claim 6 wherein the degree of membership for steering wheel angle error is between 0.0 and 1.0.

8. The method of claim 3 wherein converting the vehicle speed includes:

defining a vehicle speed membership function with linguistic term labels; and determining a corresponding degree of membership of the vehicle speed.

9. The method of claim 8 wherein the degree of membership for vehicle speed is between 0.0 and 1.0.

10. The method of claim 1 wherein determining the reaction torque control variable includes:

converting the torque error into fuzzy values based on a torque error membership function with linguistic term labels and determining a corresponding degree of membership of the torque error;

converting the actual vehicle speed into fuzzy values based on a vehicle speed membership function with linguistic term labels and determining a corresponding degree of membership of the vehicle speed;

determining a fuzzy reaction torque control variable value by determining a degree of the reaction torque control variable membership using fuzzy inference rules based on degree of membership of the torque error and vehicle speed;

converting the fuzzy reaction torque control variable to a crisp reaction torque control variable.

11. The method of claim 10 wherein converting the torque error includes:

defining a torque error membership function with linguistic term labels; and determining a corresponding degree of membership of the torque error.

12. The method of claim 11 wherein the degree of membership for torque error is between 0.0 and 1.0.

13. The method of claim 10 wherein determining the reaction torque control variable based on the torque error and the vehicle speed includes:

reading a set of fuzzy logic inference using the reaction torque control variable as conclusion and the torque error and the vehicle speed as conditions; and applying the set of fuzzy logic inference rules to infer the reaction torque control variable.

14. The method of claim 13 wherein fuzzy logic inference rules are determined based on professional vehicle driver knowledge and experience to cover the different intermediate torque control variable value.

15. The method of claim 1 wherein the actual steering wheel angle error is determined based on the actual steering wheel reference angle and the actual steering wheel angle.

16. The method of claim 1 further comprising:

generating the actual steering wheel reference angle based on the sensing road wheel angle; and determining the steering wheel angle error based on the steering wheel reference angle and the steering wheel angle.

17. The method of claim 1 wherein controlling a vehicle steer-by-wire system to provide the adjustable variable steering feel for the driver using fuzzy logic technology.

18. The method of claim 17 further comprising:

providing adjustable factors being configured to vary between a range of about 0 and 1 and providing a driving mode generating unit for transmitting a mode signal for the adjustable factors;

applying the adjustable factors in the variable steering feel fuzzy logic control algorithm; and determining the adjustable factors by applying a mode signal from the driving mode generating unit.

19. The method of claim 18 wherein the adjustable factor proportionally affects a change in the membership functions of the steering wheel angle error.

20. The method of claim 18 wherein the adjustable factor proportionally affects a change in the membership functions of the vehicle speed.

21. The method of claim 18 wherein the adjustable factor proportionally affects a change in the membership functions of the torque error.

22. The method of claim 18 wherein the mode generating unit applies fuzzy logic technology to generate the mode signal wherein the mode signal is indicative of a driving mode based on a driving style and an environmental situation.

23. The method of claim 18 wherein the adjustable variable steering feel is manually set by an occupant of the vehicle, wherein the variable mode signal is switched to a fixed constant such that the adjustable factor is constant in value.

24. The method of claim 18 wherein the adjustable variable steering feel is automatically set wherein the mode signal varies with the driving style and the environmental situation.

25. A method of controlling a vehicle steer-by-wire system to provide a variable steering feel for a driver using fuzzy logic control technology, the method comprising:

sensing an actual steering wheel angle, an actual road wheel angle, an actual road wheel torque, and an actual vehicle speed;

determining a actual steering wheel angle error based on the actual steering wheel angle and the actual road wheel angle;

converting the actual steering wheel angle error to a fuzzy steering wheel angle error variable based on a steering wheel angle error membership function with linguistic term labels and determining a corresponding degree of membership of the steering wheel angle error;

converting the actual vehicle speed to a fuzzy vehicle speed variable based on a vehicle speed membership function with linguistic term labels and determining a corresponding degree of membership of the vehicle speed;

determining a fuzzy intermediate torque control variable by determining a degree of intermediate torque control variable membership using fuzzy inference rules based on degree of membership of the steering wheel angle error and vehicle speed;

converting the fuzzy intermediate torque control variable to a crisp intermediate torque control variable value;

determining a torque error based on the intermediate torque control variable and the actual sensing or estimating road wheel torque;

converting the actual torque error to a fuzzy torque error based on a torque error membership function with linguistic term labels and determining a corresponding degree of membership of the torque error, determining a reaction torque control variable by determining the degree of reaction torque control variable membership using fuzzy inference rules based on degree of membership of torque error and vehicle speed;

converting the fuzzy reaction torque control variable to a crisp reaction torque control variable value; and applying the torque control variable to control the steering wheel reaction torque and to provide a variable steering feel for the vehicle driver.

26. The method of claim 25 wherein the actual steering wheel angle error is determined on the actual steering wheel angle and the actual road wheel angle.

27. The method of claim 25 further comprising:

generating the actual steering wheel reference angle based on the sensing road wheel angle; and determining the steering angle error based on the steering wheel reference angle and the steering wheel angle.

28. The method of claim 25 wherein determining the intermediate torque control variable based on the steering wheel angle error and the vehicle speed includes:

reading a set of fuzzy logic inference rules using the intermediate torque control variable as conclusion and the steering wheel angle error and vehicle speed as conditions; and applying the set of fuzzy logic inference rules to infer the intermediate torque control variable.

29. The method of claim 28 wherein fuzzy logic inference rules are determined based on professional vehicle driver knowledge and experience to cover the different intermediate torque control variable value.

30. The method of claim 25 wherein converting the steering wheel angle error includes:

defining a steering wheel angle error membership function with linguistic term labels;

determining the corresponding degree of membership of the steering wheel angle error.

31. The method of claim 30 wherein the degree of membership for steering wheel angle error is between 0.0 and 1.0.

32. The method of claim 25 wherein converting the vehicle speed includes:

defining a vehicle speed membership function with linguistic term labels; and determining the corresponding degree of membership of the vehicle speed.

33. The method of claim 32 wherein the degree of membership for vehicle speed is between 0.0 and 1.0.

34. The method of claim 25 wherein converting the torque error includes:

defining a torque error membership function with linguistic term labels; and determining the corresponding degree of membership of the torque error.

35. The method of claim 34 wherein the degree of membership for torque error is between 0.0 and 1.0.

36. The method of claim 25 wherein determining the reaction torque control variable based on the torque error and the vehicle speed includes:

reading a set of fuzzy logic inference rules using the reaction torque control variable as conclusion and the torque error and the vehicle speed as conditions; and applying the set of fuzzy logic inference rules to infer the equivalent reaction torque control variable.

37. The method of claim 36 wherein fuzzy logic inference rules are determined based on professional vehicle driver knowledge and experience to cover the different intermediate torque control variable value.

38. A method of controlling a vehicle steer-by-wire system to provide a variable steering feel for the driver using fuzzy logic control technology, the method comprising:

sensing an actual steering wheel angle, an actual road wheel angle, an actual road wheel torque, and an actual vehicle speed;

determining an actual steering wheel angle error based on the actual steering wheel angle and the actual road wheel angle;

using fuzzy logic inference to determine an intermediate torque control variable value by determining a degree of intermediate torque control variable membership based on degree of membership for the vehicle speed and the steering wheel angle error;

determining a torque error bused on an intermediate torque control variable value and the actual sensing or estimating road wheel torque;

using fuzzy logic inference to determine a reaction torque control variable value by determining the degree of intermediate torque control variable membership based on degree of membership for the torque error and vehicle speed; and applying the reaction torque control variable to control the steering wheel reaction torque to provide a variable steering feel for the driver.

39. A method of controlling a vehicle steer-by-wire system to provide a variable steering feel for the driver using fuzzy logic control technology, the method comprising:

sensing an actual steering wheel angle, an actual road wheel angle, an actual road wheel torque, and an actual vehicle speed;

determining a steering wheel angle error based on the actual steering wheel angle and the actual road wheel angle;

using a fuzzification to convert the steering wheel angle error to a fuzzy variable based on a steering wheel angle error membership function with linguistic term labels and determining a corresponding degree of membership of the steering wheel angle error;

using a fuzzification to convert the actual vehicle speed to a fuzzy values based on a vehicle speed membership function with linguistic term labels and determining a corresponding degree of membership of the vehicle speed;

using a first set of fuzzy logic inference rules to infer an fuzzy intermediate torque control variable value by determining the degree of an intermediate torque control variable membership function based on the degree of membership for the steering wheel angle error vehicle speed;

using a defuzzification to convert the intermediate torque control variable to a crisp intermediate torque control variable value;

determining a torque error based on the intermediate torque control variable and the actual road wheel torque;

using a fuzzification to convert the torque error to a fuzzy variable based on a torque error membership function with linguistic term labels and determining a corresponding degree of membership of the torque error;

using a second set of fuzzy logic inference rules to infer a reaction torque control variable by determining the degree of a reaction torque control variable membership function based on the degree of membership for torque error and vehicle speed;

using a defuzzification to convert the reaction torque control variable to a crisp reaction torque control variable; and applying the reaction torque control variable to control the steering wheel reaction torque to provide a variable steering feel for the driver.

40. A system for providing a steering feel for the driver of a vehicle steer-by-wire system using fuzzy logic control technology, the system comprising:

sensors for sensing an actual steering wheel angle, a road wheel angle, an actual road wheel torque, and an actual vehicle speed of the vehicle;

a steering wheel control system for providing steering feel for the driver, steering wheel angle command to the road wheel control system, and active steering wheel return based on the steering wheel angle, the actual road wheel angle, the actual road wheel torque, and the actual vehicle speed of the vehicle;

a road wheel control system for providing the actual road wheel angle tracking to the steering wheel command angle based on the actual road wheel angle;

electrical links between the steering wheel control system and the road wheel control system;

a steering wheel controller in the steering wheel control system, the steering wheel controller is a fuzzy logic controller to receive a steering wheel angle signal from the steering wheel system, road wheel angle and torque signals from the road wheel control system and vehicle speed signal from the vehicle, the steering wheel fuzzy logic controller is implemented by using a first fuzzy logic controller, and a second fuzzy logic controller, each of which using a fuzzy logic control algorithm having a fuzzification stage, an inference stage, and a defuzzification stage;

a steering wheel actuator in electrical communication with the steering wheel control system for applying the reaction torque to the steering wheel to provide a steering feel for the driver;

wherein the first fuzzy logic controller determines an intermediate torque control variable value based on a steering wheel angle error that is the difference between steering wheel angle and steering wheel reference angle based on the road wheel angle, and vehicle speed;

wherein a torque error is determined in a summer based on the intermediate torque control variable and the actual road wheel torque;

wherein the second fuzzy logic controller determines a reaction torque control variable based on the torque error and vehicle speed; and wherein the fuzzy logic controller comprising of the first fuzzy logic controller and second fuzzy logic controller controls steering wheel reaction torque to produce the variable steering feel by applying fuzzy logic control technology.

41. The system of claim 40 wherein the adjustable variable steering feel of the vehicle steer-by-wire system is based on a steering wheel fuzzy logic controller.

42. The system of claim 41 further comprising:

two adjustable factor units having adjustable factors being configured to vary in the range of 0–1;

a mode generating unit configured to transmit a mode signal indicative of a driving mode;

a fuzzy logic controller including a mode generating unit to generate a variable mode output according to driving types and environmental situations, wherein first fuzzy logic controller includes an adjustable factor and second fuzzy logic controller having another adjustable factor, adjustable factors being configured to adjust based on a driving mode, the adjustable factor units receiving a mode signal from the mode generating unit for adjusting the adjustable factors to proportionally effect a change in the membership functions of steer-by-wire system and vehicle variables, the mode signal being indicative of a driving mode based on the driving style and the environmental situation, the adjustable variable feel being set by an occupant of the vehicle or being set automatically.

* * * * *